United States Patent Office 2,739,141
Patented Mar. 20, 1956

2,739,141

PROCESS FOR PREPARING HIGHLY UNSATU-
RATED COPOLYMERS OF ISOBUTYLENE

John L. Ernst, Baton Rouge, La., and Robert M. Thomas, Westfield, N. J., assignors to Esso Research and Engineering Company, a corporation of Delaware No Drawing. Application March 31, 1951,
Serial No. 218,701

3 Claims. (Cl. 260—85.3)

This invention relates to low temperature polymerization processes and products; relates generally to the field of copolymerization of isobutylene with a diolefin having from 5 to 8 carbon atoms to yield a relatively highly unsaturated, rubbery copolymer; and relates especially to the low temperature copolymerization of isobutylene with isoprene to produce an elastic copolymer having an iodine number within the range between 55 and 175 and capable of vulcanization with sulfur and other well-known vulcanizing agents.

It has previously been found possible, as shown in U. S. Patent No. 2,356,128, to produce a series of very valuable copolymers or interpolymers having an iodine number of about 1 to 50, from a mixture of a major proportion of isobutylene with a minor proportion of a diolefin; the diolefin component having from 5 to 8 carbon atoms per molecule and more than one carbon-to-carbon double linkage. The diolefins preferred are the conjugated diolefins and particularly isoprene. The general procedure utilizes the steps of cooling a mixture of a major proportion of isobutylene with a minor proportion of the isoprene to a temperature within the range between 0° C. and −164° C.; preferably between about −60° C. to −110° C., then copolymerizing the cold mixture by the application thereto of a dissolved Friedel-Crafts catalyst with or without the presence of an inert diluent. This reaction has been advantageously conducted with isobutylene in major proportion and isoprene in minor proportion in the mixture, to yield an excellent polymer which, when cured, showed good strength and excellent physical properties.

The usual isobutylene-isoprene copolymer so prepared shows an iodine number between about 1 and 10. An iodine number of this value is satisfactory to permit a subsequent curing reaction to produce a tensile strength ranging from 1800 to 3600 pounds per square inch at break. Although this polymer shows a high resistance to the passage of air and has been found to be particularly useful for automobile inner tubes, the curing rate is relatively low, and the curing cycle takes an undesirably long time, even under the influence of the most potent accelerators. Also, the modulus (that is, the pounds pull per square inch to stretch the material) is frequently undesirably low.

It is found that in order to be curable to a rubber solid, the polymer must have a molecular weight above a definite minimum, and must have an iodine number above a definite minimum; these two factors being inter-related in such a fashion as to indicate that each molecule must have more than some definite number of units of residual unsaturation resulting from an unreacted olefinic bond in the combined isoprene residue. This minimum is desirably more than 30; but no determination has yet been made of the exact inter-relationship between measured unsaturation and actual olefinic bonds present in the polymer. It is established that a minimum Staudinger molecular weight number of about 20,000 is required in any event, and an iodine number of at least 8 and desirably 55 and up to 175 as measured by standard analytical procedures to provide a completely satisfactory, rapid curing rate.

However, these two requirements are to some extent mutually incompatible. It is well settled that diolefins, including isoprene, used as monomers in the feed mixture, exert a definite poisoning action on the catalyst and the larger the quantity of diolefin present, the more powerful the poisoning action; the chief effect of this poisoning action is to reduce the obtainable molecular weight of the polymer. Also, the ratio of copolymerizability of the isobutylene with the diolefin varies among the various diolefins. For example, the ratio of copolymerizability of butadiene is relatively quite low; a ratio of 30 parts of butadiene per 100 of isobutylene being required to copolymerize 2 to 3 parts into the polymer molecule. Isoprene is a much more powerful catalyst poison, and its copolymerizability ratio is somewhat higher, approximately 3 parts of isoprene per 100 of isobutylene being sufficient to put about 2 to 2½ parts into the polymer molecule. However, the powerful poisoning effect of isoprene on the Friedel-Crafts catalyst prevents its use in the olefinic feed mixtures in quantities sufficient to give the desirably high unsaturation. Other $C_5$ and higher diolefins also poison the catalyst, such as isoprene, and in some cases are even more powerful catalyst poisons than is isoprene.

Also, it has been established that the Staudinger molecular weight number is a function of the yield (on the isobutylene) to which the reaction is carried, since the average molecular weight of the polymer drops off sharply as the yield is increased. That is, the Staudinger molecular weight number, and with it the Mooney viscosity value, to which it is related, falls off sharply as the conversion percentage based on the isobutylene, is raised. A desirable Mooney viscosity for satisfactory milling, calendering and moulding, lies in the neighborhood of 25 to 60 or even higher, since values below 25 characterize a polymer too soft for satisfactory handling as a curable polymer. Values above 60 are too tough to be milled alone but can be used if plasticizers are employed. However, the lower the amount of combined diolefin, the lower the iodine number and the poorer the curing properties.

According to the present invention, it has been found that by using a very high purity diolefin, and specifically, isoprene, having, for instance, a mole percent purity of 99% and higher, or by using an improved polymerization catalyst, particularly a zirconium tetrachloride-organic ether complex, or by using a combination of both, it is possible to prepare copolymers of isobutylene and isoprene which have iodine numbers greater than 50 in the range of from 55 to 175 and molecular weights of at least 20,000 which are sufficiently high to render the polymers useful as vulcanizates either when employed alone or when used in conjunction with other polymers as, for instance, in blends with known isobutylene-isoprene copolymers of lower unsaturation. More specifically, it has been found that the dissolved complexes of zirconium tetrachloride with organic ethers having a molecular weight of 90 and higher, such as $\beta,\beta'$-dichloroethyl ether and diphenyl ether, have been found especially useful for the preparation of these more highly unsaturated copolymers. It is further contemplated that polymers having substantially higher iodine numbers may be obtained by blending of these new highly unsaturated polymers with polymers having lower iodine numbers to obtain a final blend having an intermediate unsaturation but substantially higher than that of the ordinary iso-olefin-diolefin copolymers. Thus, it has been found possible to prepare copolymers from olefin feed mixtures having from 25% up to 150% by weight of isoprene based on the percent of isobutylene in the feed. In comparison to this value, the usual amount of isoprene which is employed in the preparation of the ordinary well-known isobutylene-diolefin copolymers is in the range of from 1% to about 5% up to 10% by weight based on the isobutylene, the most common value being 2.5 to 3.5%.

It has been found that the molecular weight as judged by the Mooney viscosity values, does not continue to decrease with corresponding diolefin content in the feed, although such a decrease would be expected. Rather, the molecular weight of the copolymer passes through a minimum value and thereafter as the diolefin content is increased, the molecular weight tends to increase, thereby giving polymers having satisfactory molecular weights in spite of the presence of more diolefin in the feed and consequently higher unsaturation in the final copolymer. In general, this minimum point has also been found to exist for a number of the processing properties of these novel polymers, the processing properties being judged by the extrusion rate and the extrusion swell. For example, the extrusion performance of the isobutylene-diolefin copolymers, including those with isoprene as the diolefin, becomes somewhat poorer as the iodine number is increased from a value of about 1 up to about 50, which is the maximum value found for the ordinary isobutylene-diolefin copolymers prepared by well-known processes. However, polymers having iodine numbers beyond the value of about 50 show increasingly better extrusion performance as the iodine number is further increased.

In view of the striking differences in increased iodine number obtained when the mole percent purity of isoprene used is above 99%, there exists a strong possibility that not only is the isoprene functioning as a catalyst poison to affect adversely the molecular weight of the polymer, but also that there is present in ordinary isoprene some other, and possibly more powerful, catalyst poison. This offers one explanation of the fact that isoprene of lower purity gives polymers having reduced molecular weights which render the polymer substantially useless, while the use of the very high purity isoprene quite surprisingly gives polymers which not only have satisfactory molecular weights but also have the highly desired higher degree of unsaturation.

For instance, a typical isoprene of ordinary quality (97.3% isoprene) shows the following analysis:

| Component: | Weight percent |
| --- | --- |
| Isoprene | 97.3 |
| Pentene-1 (some 2-methyl butene-1) | 1.8 |
| Cyclopentadiene | 0.2 |
| Piperylene | 0.3 |
| Alpha-acetylenes | 0.1 |
| Higher boiling (mostly isoprene dimer) | 0.3 |
| Total | 100.00 |

It has further been found that a highly desirable copolymer having both higher molecular weight and increased iodine number can be prepared by a novel process in which a zirconium tetrachloride-organic ether complex is employed in solution as a polymerization catalyst. It is also possible to use this novel catalyst process in conjunction with the very high purity isoprene in order to obtain optimum advantages.

In using the novel catalyst, the polymerization of the olefinic mixture containing, for instance, a major proportion of isobutylene and a minor proportion of isoprene, is brought about by the application thereto of a solubilized zirconium-containing catalyst. In the preferred modification, the catalyst employed for obtaining a maximum unsaturation in the finished polymer is a zirconium halide-ether complex, the ether employed being selected from organic ethers which possess properties, making them particularly appropriate for complexing with zirconium halide and particularly with zirconium chloride.

The zirconium chloride-ether complex is desirably employed in the form of a solution and may conveniently be dissolved in an organic solvent which does not interfere or further complex with the catalyst and which is liquid at the polymerization temperature.

It may be that there appears to be substantially no limitation upon the ethers which are used in the formation of the ether complexes. The simple lower dialkyl ethers, such as methyl or ethyl ether, are operative for the purposes of the present invention as well as the higher ethers, such as the propyl, butyl and amyl ethers. Alkylaryl ethers are also useful. It should be noted that substituted ethers such as chloro-substituted ethyl ether are also quite satisfactory. Ethers which may be used for preparing the zirconium chloride complexes include: ethyl ether, di-n-propyl ether, diisopropyl ether, the dibutyl ethers, anisole and its derivatives, diphenyl ether, $\beta,\beta'$-dichloroethyl ether, $\alpha,\alpha'$-dichloroethyl ether, 1,2-diphenoxy ethane, o-chlorophenyl ethyl ether, $\beta$-chloroethyl phenyl ether, diethylene oxide, trioxymethylene, dichloromethyl ether, and the like.

The zirconium chloride-organic ether catalyst complexes are desirably used in solution in a low-freezing, non-complex-forming solvent, by which there is meant a solvent which will dissolve an adequate amount of the catalyst complex, for example, at least 0.1% by weight. In addition, the solvent should not form a further complex with the zirconium tetrachloride-ether catalyst complex. For the solvent, substantially any of the mono- or poly-halogenated alkanes having freezing points below about $-10°$ C., as well as carbon disulfide, may be employed. Methyl chloride, methyl bromide, dichloro methane, ethyl chloride, and the like, are particularly useful. Hydrocarbon solvents, such as propane, butane, and the pentanes in some cases, may also be suited for use in the polymerization reactor.

One quite satisfactory method for preparing the zirconium tetrachloride-ether complex catalyst solution is carried out by dissolving the appropriate amount of the complexing ether agent in the alkyl halide solvent and thereafter passing the alkyl halide-ether mixture through a bed of zirconium tetrachloride, thereby causing the formation of the zirconium tetrachloride-ether complex within the alkyl halide itself. The concentration of the catalyst in the final catalyst solution is thus dependent on the amount of ether initially dissolved in the alkyl halide.

In past practice, the well-known aluminum chloride catalyst solutions in alkyl halides, for instance, methyl and ethyl chloride, were prepared by passing the desired alkyl halide through a cartridge containing aluminum chloride. However, control of the concentration of aluminum chloride in the alkyl halide solvent is somewhat difficult because of changing solubility with temperature, rate of flow of the alkyl halide, and the necessity for diluting the original solution to obtain the desired concentration. Zirconium tetrachloride must be employed in solution for maximum effect. Zirconium tetrachloride is insoluble in alkyl halides. When the zirconium tetrachloride is used in the form of an ether complex, the complex is soluble in alkyl halides which can be employed as solvents for the catalyst as well as diluents for the reaction mixture. This type of operation is possible because of the formation of the molecular complex of the zirconium tetrachloride with numerous ether compounds such as $\beta,\beta'$-dichloroethyl ether, diphenyl ether, isopropyl ether, anisole, and various other ethers which are soluble in the alkyl halides. The preferred method of preparing the catalyst solution offers the additional advantage that the amount of zirconium tetrachloride, the catalytic agent in the final solution, can be critically controlled by the amount of ether dissolved in the alkyl halide prior to its passage over the $ZrCl_4$.

The catalyst solution prepared as above described or in some other convenient manner, is applied to the cold mixed olefinic material containing the isobutylene and the diolefin in the form of a spray delivered onto the surface of the rapidly agitated olefinic mixture. Alternatively, the catalyst solution may be delivered as a jet stream onto a zone of high turbulence in the olefinic mixture in any convenient way or it may be delivered in any other way which produces a rapid dispersion of a catalyst solution into the cold olefinic mixture. The concentration of the active catalyst in the solution may vary between 0.05% by weight and 15% by weight and generally the rate of addition of catalyst solution may vary between 0.05% to 5% by weight per minute, based on the reactor contents. By adding more catalyst over a longer period of time, higher conversion will be obtained. In general, about 0.01 to 1.0 weight percent catalyst is employed, the catalyst efficiency being about 100 to 10,000 grams of polymer produced per gram of catalyst used. The polymerization proceeds rapidly to yield a solid, rubbery copolymer having a Staudinger molecular weight which may vary between 20,000 and 100,000; the lower the polymerization temperature, the higher the molecular weight, all other factors in the reaction being equal.

Table I below shows the Mooney viscosity, Staudinger molecular weight, mole percent unsaturation, and iodine number values, of a number of polymers prepared by the processes of this invention and by a typical process as disclosed in the prior art employing aluminum chloride in solution in methyl chloride as a polymerization catalyst and isoprene of about 96% purity. It should be noted that, in general, in any one series of runs, when the same percentage of isoprene was employed, the run in which the mole percent purity of isoprene was above 99%, although aluminum chloride dissolved in methyl chloride was employed as a catalyst, the Mooney viscosity was quite high and the iodine number was high, indicating a satisfactory molecular weight in relation to the increased iodine number, all of which are between 55 and 175. Likewise, good relationship between molecular weight and iodine number was observed for the products in which the zirconium tetrachloride-organic ether complex was employed as polymerization catalyst. However, when using a conventional lower purity isoprene, of around 96 mole percent, with the conventional polymerization catalyst consisting of aluminum chloride dissolved in methyl chloride and carrying the reaction out with sufficient isoprene in the feed to obtain the desired increased iodine number, the Mooney viscosity was so low as to indicate a polymer product of greatly reduced usefulness. Products having such low Mooney viscosity values are difficult or impossible to vulcanize and process into finished rubber products. In each case, the total amounts of active catalyst employed was the same.

The reaction may be conducted in a continuous reactor, or it may be conducted in a succession of separate batches, there being little choice between the two with respect to the quality of the polymer produced, although continuous operation does offer certain practical advantages.

In carrying out either a continuous or batchwise process, there is first prepared a mixture of isobutylene and isoprene in which the isoprene is present in a percentage of from about 25 up to 150% by weight based on the amount of isobutylene in the reaction mixture. It is particularly desirable that high purity components be used, the isobutylene desirably being of at least 98% purity and the isoprene desirably of at least 96% purity, and preferably 99% purity when employed with conventional Friedel-Crafts polymerization catalysts. It appears that, in order to use conventional Friedel-Crafts catalysts, there must be not more than about 1% maximum of impurities. It may be noted that the presence of small amounts of saturates such as butene and propane is probably immaterial, but the presence of propylene, butene-1 or butene-2, pentenes, and certain other interfering impurities, is undesirable.

This mixture may be polymerized as such, if desired, but usually, superior results in operation as well as in the finished product are obtained by polymerization in the presence of a diluent.

For the diluent, there may be used one or more of the lower halo-substituted aliphatics such as ethyl or methyl chloride, methylene or ethylene dichloride, chloroform, the several ethyl chlorides, the several propyl chlorides, the corresponding fluorides, some of the corresponding bromides, and the like. Any of the halo-substituted aliphatics having a freezing point below the polymerization temperature are usable as diluents. Alternatively, carbon disulfide or the low-freezing hydrocarbons may also be used; again, it being merely necessary that the freezing point of the diluent be below the polymerization temperature. The requirements are, generally, that the substance be a liquid at the polymerizable temperature and that it be non-reactive with the unsaturates and with the catalyst. In general, the requirements for the diluent are closely similar to those for the catalyst solvent in that the diluent also must be low freezing and non-complex-forming with the polymerization catalyst.

Either before or after mixing, the materials are cooled to a temperature below about 0° C. preparatory to the polymerization procedure. For the polymerization reaction, the preferred temperature lies below 0° C. and preferably within the range between about −60° C. and −110° C., although temperatures as low as −164° C. may be used. The cold reaction mixture is placed in a reactor vessel which may consist of a batch

*Table I*

| Run No. | Percent Isoprene on Isobutylene in Feed | Mole Percent Purity of Isoprene | Type of Catalyst [1] | 8-Minute Mooney Viscosity | Molecular Weight (Staudinger) | Mole Percent Unsaturation Drastic Mercuric Acetate Method | Iodine No. Calculated from Unsaturation |
|---|---|---|---|---|---|---|---|
| 1 | 25 | 99+ | AlCl₃ | 53 |  | 8.08 | 55 |
| 2 | 25 | 96 | ZrCl₄ | 43 | 27,700 |  | 55 |
| 3 | 25 | 96 | AlCl₃ | 18 |  |  | 55 |
| 4 | 30 | 99+ | AlCl₃ | 54 |  | 9.04 | 61 |
| 5 | 30 | 96 | ZrCl₄ | 34 | 25,500 |  | 61 |
| 6 | 30 | 96 | AlCl₃ | 22 |  |  | 61 |
| 7 | 100 | 96 | ZrCl₄ | 40 |  | ² 18.95 | 128 |
| 8 | 100 | 99 | ZrCl₄ | 75 |  |  | 128 |
| 9 | 100 | 99 | AlCl₃ | 67 |  |  | 128 |
| 10 | 100 | 96 | AlCl₃ | 42 |  |  | 128 |

[1] AlCl₃—Solution containing .24 g. AlCl₃/100 cc. methyl chloride; ZrCl₄—Solution containing .32 g. ZrCl₄ as ZrCl₄·(ClCH₂CH₂)₂O/400 cc. methyl chloride.

² Due to difficulty in dissolving sample, this value is probably no better than an estimate and probably should be higher.

type or a continuous type reactor. In either type of reactor, it is usually desirable to provide a refrigerating jacket upon the reactor, the jacket being filled with any convenient refrigerant which has a boiling point, with some convenient exhaust pressure, at the desired temperature.

Convenient refrigerants are such substances as $CO_2$, either as such or in admixture with an appropriate low-freezing carbon compound such as propyl alcohol or pentane, or the like. Highly satisfactory refrigerants are liquid ethane, setting a temperature of $-88°$ C., and liquid ethylene setting a temperature of $-103°$ C.

Alternatively, an internal refrigerant may be used, for which purpose it is necessary that the mixed boiling point be within the desired range and that the internal refrigerant be inert and non-reactive with respect to the polymerization catalyst. Liquid or solid $CO_2$, liquid ethane, and liquid ethylene all meet these requirements and are the preferred internal refrigerants.

If the high purity (above 99%) isoprene is being employed, the reaction mixture is polymerized by the application thereto of a Friedel-Crafts active metal halide catalyst in solution in a low-freezing, non-complex-forming solvent. The preferred catalyst for use with the high purity isoprene is aluminum chloride. Various other Friedel-Crafts active metal halide substances are also usable, including aluminum bromide, titanium tetrachloride, uranium chloride, the mixed chloro bromides, especially of aluminum and of titanium, the chloro alk-oxides, especially of aluminum, and the like. These catalysts cannot be used in solid form because of the low solubility of the solid material in the olefinic material and/or the low rate of solution which permits particles of solids to be surrounded by a very thin layer of initially formed polymer which thereafter prevents further solution and further polymerization. It is essential that when a solid, curable polymer is to be made, the catalyst be fluid. Titanium tetrachloride is fluid at room temperature and fluid at a low enough temperature to be readily incorporated into the unsaturate mixture. The other catalyst substances are readily soluble to a satisfactory concentration in the catalyst solvents, such as the halo-substituted aliphatics, or in some instances, in the hydrocarbons themselves to produce excellent catalyst solutions.

For the preparation of 99% or better purity isoprene, the impure material is freed of peroxide by addition of inhibitor, contacted with liquid sulfur dioxide at about 50° to 100° C., to form sulfone without substantial formation of polysulfones, and the sulfone isolated, and isoprene regenerated by heating to about 120° to 150° C. The resulting material is of 99% or better purity.

For the catalyst solvent, any non-complex-forming solvent which is liquid when first contacted with the cold reaction mixture and which will dissolve appropriate amounts of polymerization catalyst, is suitable. Particularly useful are ethyl and methyl chlorides. Similarly useful solvents are such substances as carbon disulfide, methylene dichloride, ethylene dichloride, chloroform, tri- and tetra-chloroethane, ethylidene fluoride, some of the organic chloro fluorides, and the like.

The particular catalyst solution employed is preferably sprayed onto the surface of the rapidly stirred cold mixture or delivered in the form of a fine high-pressure jet into the body of the cold reaction mixture. In any case, the catalyst solution must necessarily be introduced into a zone of turbulent agitation to insure its rapid and complete mixing with the olefinic reactants.

The amount of catalyst to be used is determined by the conversion desired. In general, the desirable amount of catalyst is such as to yield a polymer having a weight equal to from 10% to essentially the full amount of isobutylene present, since the conversion is usually measured in terms of the amount of isobutylene. Preferably, the conversion limits are from 40% to 90% of the isobutylene. This procedure as to conversion rate usually leaves in the polymerizate mixture an appreciable quantity of unpolymerized isoprene, as well as possibly some monomeric isobutylene. When the desired amount of polymer has been produced, the reaction mixture with the contained polymer is preferably dumped into warm water to bring the solid polymer up to room temperature and vaporize out the residual materials from the polymerization mixture. The unreacted, recovered olefins and diluent can be suitably recovered and re-used, if desired. Subsequently, the solid polymer is discharged as a slurry in water from which it is filtered, dried, and milled for packaging, shipping and use. The catalyst may be inactivated while still cold, with such agents as alcohols, ethers, ketones, amines, and ammonia.

This invention yields, as a novel composition, an isobutylene-isoprene polymer having a Staudinger molecular weight number lying within the range between about 20,000 to 100,000, and an iodine number of 55 to 175. The correspondingly related 8-minute Mooney viscosity values should be at least 25 or higher up to 60 in order for the polymer to cure satisfactorily. This limited range is essential because of the fact that polymers having lower molecular weights either do not cure at all, or cure too poorly to be commercially useful and polymers having molecular weights higher than this range are so tough and leathery that they are extremely difficult to process on the mill as such although, in some cases, they can be softened with oil and high loading with oils and other plasticizers also helps. The exact range of molecular weights depends in part upon the temperature, in part upon the catalyst, and in part upon the precise proportion of isobutylene and isoprene used. The polymer also shows an iodine number within the range between about 55 and about 175, the exact iodine number value being in part determined by the original proportion between the isobutylene and the isoprene, and in part determined by the percentage yield, or the percent of the unsaturates which are copolymerized.

In addition to the use of these more highly unsaturated isobutylene-diolefin copolymers alone as vulcanizates where a fast cure rate and improved processing and cure properties are desired, this invention also contemplates compositions prepared by blending relatively minor amounts of from 1% to 25% of these more highly unsaturated polymers prepared from olefin mixtures containing at least 20 and up to 100% of isoprene based on the isobutylene, with from 99 to 75% of the regular isobutylene-diolefin copolymers, as described in U. S. Patent No. 2,356,128. Both butadiene and isoprene are commonly employed as the diolefin. The polymers of the GR-I type, this being the commercial designation for a copolymer prepared from a mixture of isobutylene and isoprene, in which there is from about 1 to 5% isoprene in the olefin feed mixture based on the isobutylene, are particularly useful. These GR-I polymers usually have iodine numbers of from about 1 up to a maximum of 50. It has been found that these blends possess very good processing properties and give fast curing, high modulus, vulcanized products.

These blends may be prepared by any standard procedure used for intimate admixing of two or more rubber-like components, such as by ordinary milling, extruding, and blending operations and the like. One good method is by the use of a Banbury mixer. The blends contemplated include compositions consisting of up to 25% of the more highly unsaturated copolymer with the remainder of the blend consisting essentially of the ordinary, less unsaturated isobutylene-isoprene copolymer.

The finished highly unsaturated polymers and the blends are prepared for commercial use by any appropriate compounding treatment known to the art. It is usually desirable to incorporate a substantial amount of reinforcing carbon black. Any of the various types of carbon black are useful, according to the particular structure to be made from the rubber. The carbon black may be present in amounts from 10 parts by weight to 100 parts by weight per 100 of polymer and on occasion as much as 200 parts by weight may be used. The compounding recipe also desirably includes from 0.5 part by weight to 10 parts by weight of stearic acid per 100 of polymer. In addition, there usually is desirably present from 1 part by weight to about 20 parts by weight of zinc oxide, which may, on occasion, be replaced by varying amounts, up to about 10 parts by weight of zinc stearate. About 5% to 30% of a mineral oil or an ester plasticizer may be added to improve processability and/or properties of the ultimate vulcanizates. The compounding recipe also usually includes a curing agent. Sulfur alone may not be commercially satisfactory because of the extremely slow curing rate and the difficulty of reaching a complete cure. Accordingly, a sulfurization aid or "accelerator" is usually included. This may conveniently be tetramethyl thiuram disulfide which, however, may be used in considerably smaller proportions than is required by the low unsaturation and, consequently, difficultly curable, polymer of the prior art. Alternatively, however, such agents as mercaptobenzothiazole, zinc mercaptobenzothiazole, selenium tetraethyl dithiocarbamate, tetramethyl thiuram monosulfide, zinc dibutyl dithiocarbamate, or dipentamethylene thiuram tetrasulfide, may be used. Most of the less active accelerating agents, which are of minor or no value with the low unsaturation copolymers of the prior art, are more valuable with the present, more highly unsaturated, polymers and blends of this invention.

Alternatively, such substances as para quinone dioxime or its analogues or homologues or their organic or inorganic esters, are particularly valuable since the cure rate is very high and the state of cure excellent. The dinitroso compounds are also valuable curing agents and with these compounds, particularly, the curing may proceed fairly rapidly at room temperature.

These agents all react with the material to destroy the plasticity which is characteristic of the polymer as it is received from the polymerizer or the drier and develop in it a definite tensile strength, a definite elongation at break, and a definite modulus of elasticity (that is, the pounds pull per square inch required to stretch the material 300% or 400%). This characteristic, plus a substantially complete insolubility in light naphtha are essential features of the cured polymers or polymer blends.

The following examples present a number of specific embodiments of the invention, although it is not intended that the broad inventive concept be limited thereto.

EXAMPLE I

A series of polymerizations was conducted upon a number of mixtures of polymerizable reaction mixtures containing various percentages of high purity isoprene based on the total isobutylene in the feed, the percentage of isoprene ranging from 25% to 100% by weight. The isobutylene used had a purity of at least 96% and the isoprene a purity of 99% or better. The 99% isoprene was obtained by fractionation of a crude fraction, taking only a small amount of a heart cut. These polymerizations were conducted with methyl chloride as the diluent, the weight ratio of methyl chloride to isobutylene being kept constant at 2:1. In each case, the reactants and diluents were blended together in an agitated stainless steel reactor and were chilled to −140° F. by means of external refrigeration. The catalyst solution was cooled to −108° F. and added as a fine spray to the agitated mixture of olefinic reactants and diluent.

The catalyst consisted of a solution of aluminum chloride in methyl chloride in a concentration of approximately .24 gram of aluminum chloride per 100 cc. of methyl chloride. The various batches were polymerized in part only, in each case at least 20% of the isobutylene in the mixture being converted into polymer.

Following a work-up of the polymerization mixture in the usual way, these batches of polymer were compounded and the properties of the resulting compounded products investigated. The formulation for compounding the experimental batches is shown in the following recipe:

| Component: | Parts by weight |
|---|---|
| Polymer | 100 |
| Zinc oxide | 5 |
| Stearic acid | 3 |
| Carbon black | 50 |
| Mercaptobenzothiazole | 1.5 |
| Diphenyl guanidine | 0.5 |
| Sulfur | 2 |

The inspection of the polymer with regard to the Mooney viscosity as well as the data obtained on the compounded and cured samples are shown in Table II below.

*Table II*

PROPERTIES OF COPOLYMERS PREPARED FROM HIGH PERCENTAGE ISOPRENE FEED

| Run No. | Percentage of High Purity Isoprene Based on Isobutylene in the Feed | 8-Minute Mooney Viscosity | Cures at 307° F. | | | | | |
|---|---|---|---|---|---|---|---|---|
| | | | Tensile Strength, p. s. i. from Curing Times at— | | 300% Modulus from Curing Times at— | | Elongation, Percent from Curing Times at— | |
| | | | 10′ | 20′ | 10′ | 20′ | 10′ | 20′ |
| 11 | 25 | 66 | 1,725 | 1,750 | 660 | 1,050 | 670 | 480 |
| 12 | 33 | 60 | 1,450 | 2,075 | 760 | 1,350 | 480 | 430 |
| 13 | 40 | 71 | 1,360 | 1,650 | 960 | 1,400 | 420 | 340 |
| 14 | 100 | | 1,375 | 1,650 | | | 210 | 170 |

EXAMPLE II

A series of blends were prepared in which varying parts by weight of isobutylene-isoprene copolymers prepared from olefin feed mixtures having from 65 to 150% by weight of isoprene based on the isobutylene used, were admixed with GR–I. In general, the blends were prepared using a major proportion of the GR–I and a minor proportion of the more highly unsaturated isoprene-isobutylene copolymer. For the sake of convenience, the symbols in the following table were used to indicate the samples corresponding to the feed compositions used in their preparation:

| Polymer | Feed Composition | |
|---|---|---|
| | Isobutylene, Parts by wt. | Isoprene, Parts by wt. |
| A | 100 | 65 |
| B | 100 | 100 |
| C | 100 | 150 |

Table III shows the data obtained in a study of extrusion and flow properties together with the data obtained from the testing of the cured compounded polymer. The blends of the minor amounts of the more highly unsaturated copolymer with the regular GR-I possess very good processing properties and give fast curing and high modulus compounds. It is especially noteworthy that the addition of polymer B prepared from 50-50 weight percent mixtures of isobutylene and isoprene feed shows increased extrusion rate and reduced extrusion swell as measured by grams per inch of extruded tube. Furthermore, there are only slight effects on the flow properties produced by the blending. The greatly increased moduli values of the vulcanizates are also decided advantages of the blends.

The compounding formula used for the extrusion tests and the flow tests consisted of 100 parts by weight of the polymer blend together with about 50 parts of carbon black. For the extrusion test, a No. ½ Royle extruder with head and barrel at 220° F. was used. For the flow test, cylindrical pellets were compressed under a load of 1.81 kg./sq. cm. at 40° C. for 3 minutes, and then allowed to recover for 20 minutes at 40° C. The formulation used in the determination of vulcanizate properties was as follows:

| Component: | Parts by weight |
|---|---|
| Polymer | 100 |
| Zinc oxide | 5 |
| Stearic acid | 3 |
| Carbon black | 50 |
| Tetramethyl thiuram disulfide | 1 |
| Mercaptobenzothiazole | 0.5 |
| Sulfur | 2 |

EXAMPLE III

Table IV shows similar data in which GR-I was blended with high percentage isoprene-isobutylene copolymers. These data likewise indicate the good results obtained from the blends, particularly in the improved moduli values of the blends.

*Table IV*

BLENDS OF HIGH PERCENTAGE ISOPRENE-ISOBUTYLENE POLYMERS WITH GR-I POLYMER

| GR-I, Parts By Weight | Blending Agent | | | Vulcanizate Properties | | | | |
|---|---|---|---|---|---|---|---|---|
| | Parts By Weight | Type Polymer | 8-Min. Mooney Viscosity | Cure Time, Min. | Tensile Strength, p.s.i. | 300% Modulus, p.s.i. | 400% Modulus, p.s.i. | Elongation, percent |
| 100 | | | | 10 | 2,300 | 210 | 340 | 1,030 |
| | | | | 20 | 2,725 | 400 | 660 | 890 |
| | | | | 40 | 2,800 | 620 | 1,010 | 760 |
| | | | | 80 | 2,760 | 820 | 1,340 | 640 |
| 90 | 10 | Polymer A | 61 | 10 | 2,300 | 340 | 520 | 960 |
| | | | | 20 | 2,675 | 560 | 880 | 850 |
| | | | | 40 | 2,825 | 840 | 1,250 | 730 |
| | | | | 80 | 2,825 | 1,060 | 1,570 | 650 |
| 90 | 10 | Polymer B | 56 | 10 | 1,825 | 500 | 730 | 840 |
| | | | | 20 | 2,075 | 820 | 1,170 | 660 |
| | | | | 40 | 2,275 | 960 | 1,370 | 650 |
| | | | | 80 | 2,225 | 1,010 | 1,460 | 620 |
| 90 | 10 | Polymer C | 64 | 10 | 1,675 | 530 | 750 | 800 |
| | | | | 20 | 1,950 | 820 | 1,160 | 670 |
| | | | | 40 | 2,000 | 880 | 1,230 | 640 |
| | | | | 80 | 1,850 | 850 | 1,210 | 620 |
| 90 | 10 | Polymer B | 35 | 10 | 1,875 | 510 | 770 | 780 |
| | | | | 20 | 2,150 | 850 | 1,210 | 660 |
| | | | | 40 | 2,225 | 960 | 1,420 | 600 |
| | | | | 80 | 2,075 | 980 | 1,430 | 590 |
| 90 | 10 | do | 79 | 10 | 2,025 | 460 | 730 | 800 |
| | | | | 20 | 2,250 | 760 | 1,120 | 700 |
| | | | | 40 | 2,350 | 900 | 1,350 | 650 |
| | | | | 80 | 2,300 | 1,010 | 1,490 | 610 |

EXAMPLE IV

Table V below shows the data obtained from a series of blends prepared by milling together from 75 to 100 parts by weight of GR-I with from 25 to 0 parts by weight of a high unsaturation isobutylene-isoprene copolymer prepared from a feed mixture containing equal parts of isobutylene and isoprene. Here again, the marked improvement in the physical properties of the corresponding vulcanizate prepared from the blends is evident, particularly in the increased moduli values.

Table VI indicates the plasticizer tolerance of a number of these polymer blends having high unsaturations. It is to be noted that the plasticizer behavior of the blends is comparable, and in some cases, better than the behavior of the GR-I alone.

*Table III*

BLENDS OF HIGH PERCENTAGE ISOPRENE-ISOBUTYLENE COPOLYMER WITH GR-I POLYMER

| Polymer Description | Extrusion | | | Flow | | Properties of Vulcanizates | | | | |
|---|---|---|---|---|---|---|---|---|---|---|
| | In./Min. | G./In. | Appearance | Total Def., Percent | Unrecov. Flow, Percent | Cure, minutes | Tensile | 300% Mod. | 400% Mod. | Elong. |
| GR-I | 47.5 | 2.11 | Smooth | 40.5 | 15.6 | 20 | 3,075 | 490 | 770 | 860 |
| | | | | | | 40 | 3,100 | 710 | 1,120 | 750 |
| | | | | | | 80 | 3,050 | 1,050 | 1,570 | 650 |
| GR-I, 90 parts Polymer B, 10 parts | 49.5 | 2.03 | do | 38.5 | 15.8 | 20 | 2,500 | 1,010 | 1,420 | 650 |
| | | | | | | 40 | 2,575 | 1,240 | 1,720 | 590 |
| | | | | | | 80 | 2,450 | 1,310 | 1,810 | 550 |
| GR-I, 75 parts Polymer B, 25 parts | 54 | 1.93 | do | 37.0 | 12.3 | 20 | 1,525 | 1,210 | 1,520 | 410 |
| | | | | | | 40 | 1,500 | 1,280 | | 360 |
| | | | | | | 80 | 1,275 | 1,190 | | 360 |

Table V

PROPERTIES OF POLYMER B/GR-I BLENDS

| Parts by weight GR-I | Parts by weight of Polymer B | Vulcanizate Physical Properties | | | | | |
|---|---|---|---|---|---|---|---|
| | | Cure Time, Min. | Tensile Strength, p.s.i. | 300% Modulus, p.s.i. | 400% Modulus, p.s.i. | Elongation, Percent | Tear, #/In. |
| 100 | | 5 | 1,500 | 200 | 340 | 960 | 205 |
| | | 10 | 1,950 | 500 | 770 | 780 | 255 |
| | | 20 | 1,825 | 830 | 1,180 | 630 | 200 |
| | | 40 | 1,650 | 1,120 | 1,500 | 470 | 125 |
| 95 | 5 | 5 | 1,500 | 480 | 690 | 740 | 220 |
| | | 10 | 1,775 | 830 | 1,180 | 630 | 250 |
| | | 20 | 1,850 | 1,200 | 1,560 | 510 | 220 |
| | | 40 | 1,825 | 1,280 | 1,680 | 430 | 190 |
| 90 | 10 | 5 | 1,275 | 530 | 740 | 670 | 200 |
| | | 10 | 1,525 | 840 | 1,180 | 550 | 235 |
| | | 20 | 1,575 | 1,050 | 1,400 | 470 | 230 |
| | | 40 | 1,600 | 1,150 | 1,490 | 450 | 190 |
| 75 | 25 | 5 | 725 | 520 | 630 | 520 | 135 |
| | | 10 | 850 | 700 | 820 | 430 | 145 |
| | | 20 | 825 | 700 | | 390 | 145 |
| | | 40 | | | | | 140 |

Table VI

PLASTICIZER TOLERANCE OF POLYMER B/GR-I BLENDS [1]

| GR-I Parts By Weight | Polymer B, Parts By Weight | Plasticizer Oil, Parts By Weight | Extrusion Data | | | Flow Properties | | |
|---|---|---|---|---|---|---|---|---|
| | | | In./Min. | Gm./In. | Appearance | Comp. Time, Min. | Total Def., Percent | Unrecovered Flow, Percent |
| 100 | | | 48.5 | 2.14 | Smooth | 1 | 32.8 | 7.7 |
| | | | | | | 3 | 45.1 | 21.0 |
| 100 | | 10 | 51 | 2.24 | do | 1 | 46.4 | 21.3 |
| | | | | | | 3 | 58.2 | 40.0 |
| 90 | 10 | | 48 | 2.05 | do | 1 | 27.7 | 6.7 |
| | | | | | | 3 | 39.5 | 16.9 |
| 90 | 10 | 10 | 54.5 | 2.00 | do | 1 | 41.8 | 15.5 |
| | | | | | | 3 | 54.8 | 34.7 |

[1] Stocks were formulated with 50 parts of carbon black.

EXAMPLE V

Two samples were made up into typical floor tile type formations, one sample employing ordinary, low unsaturation GR-I copolymer and the other employing the high unsaturation isopreneisobutylene copolymer of this invention. The particular copolymer used showed an actual unsaturation of 8 to 10% and a Mooney value of 30 to 35.

The formulation used was as follows:

| Component: | Parts by weight |
|---|---|
| Polymer | 100 |
| Stearic acid | 1 |
| Zinc oxide | 10 |
| Sulfur | 3 |
| White solid fillers | 350 |
| Tributoxy ethyl phosphate | 2 |
| Plasticizer | 3 |
| Tetramethyl thiuram disulfide | 2 |
| Mercaptobenzothiazole | 0.75 |

In testing these two formulations for the preparation of floor tile, it was found that during vulcanization of the more highly unsaturated copolymer its behavior was distinctly better than that of the GR-I. The improvement included the marked ease of release of the molded object immediately upon opening the mold following the curing operation. A marked improvement in hardness properties was also noted. The GR-I has been found to have a Shore hardness in the range of 62 to 70 when cured from 10 to 30 minutes at 324° F. The more highly unsaturated polymer shows a Shore hardness of 84 after a 5 minute cure at 327° F. and a Shore hardness of 88 following a 10 minute cure. In addition, tests on the GR-I indicate that the elongation has dropped from over 370% to 180%. The cured tiles of the high unsaturation copolymer were observed to have a much improved resilience.

What is claimed is:

1. A low temperature polymerization process for making synthetic rubber comprising the steps of mixing together 100 parts by weight of isobutylene and from 25 to 150 parts by weight of isoprene having a purity of at least 99 mole percent, cooling the material to a temperature within the range between 0° C. and −164° C., and thereafter polymerizing the mixture by the application thereto of a solution of aluminum chloride in methyl chloride to yield a rubbery copolymer characterized by a molecular weight between 20,000 and 100,000, an 8-minute Mooney value above about 50, and an iodine number between 55 and 175.

2. A low temperature polymerization process for making synthetic rubber comprising the steps of mixing together 100 parts by weight of isobutylene and from 25 to 150 parts by weight of isoprene having a purity of at least 99 mole percent, cooling the mixture to a temperature within the range between 0° C. and −164° C., and thereafter polymerizing the mixture by the application thereto of a Friedel-Crafts catalyst in fluid form selected from the group consisting of aluminum chloride, aluminum bromide, titanium tetrachloride, uranium chloride, aluminum chloro-bromides and titanium chloro-bromides, to yield a rubbery copolymer having a molecular weight between 20,000 and 100,000, an 8-minute Mooney value above about 50, and an iodine number between 55 and 175.

3. A low temperature polymerization process for making synthetic rubber comprising the steps of mixing together 50 parts by weight of isobutylene and 50 parts by weight of isoprene having a purity of at least 99 mole percent, cooling the mixture to a temperature within the range between −40° C. and −110° C., and thereafter polymerizing the mixture by the application thereto of a solution of aluminum chloride in methyl chloride to yield a rubbery copolymer having a molecular weight between 20,000 and 100,000, an 8-minute Mooney value above about 50, and an iodine number between 55 and 175.

References Cited in the file of this patent

UNITED STATES PATENTS

| | | |
|---|---|---|
| 2,305,007 | Hopff | Dec. 15, 1942 |
| 2,332,194 | Beekley | Oct. 19, 1943 |
| 2,356,128 | Thomas | Aug. 22, 1944 |
| 2,559,062 | Dornte | July 3, 1951 |
| 2,587,430 | Baldwin | Feb. 26, 1952 |
| 2,607,764 | Nelson | Aug. 19, 1952 |